Aug 7, 1923.

W. H. BERWICK 1,464,403

CALCULATING MACHINE

Filed Aug. 23, 1921

WITNESSES
William P. Goebel.
Franklin J. Foster

INVENTOR
W.H. BERWICK
BY Munn & Co
ATTORNEYS

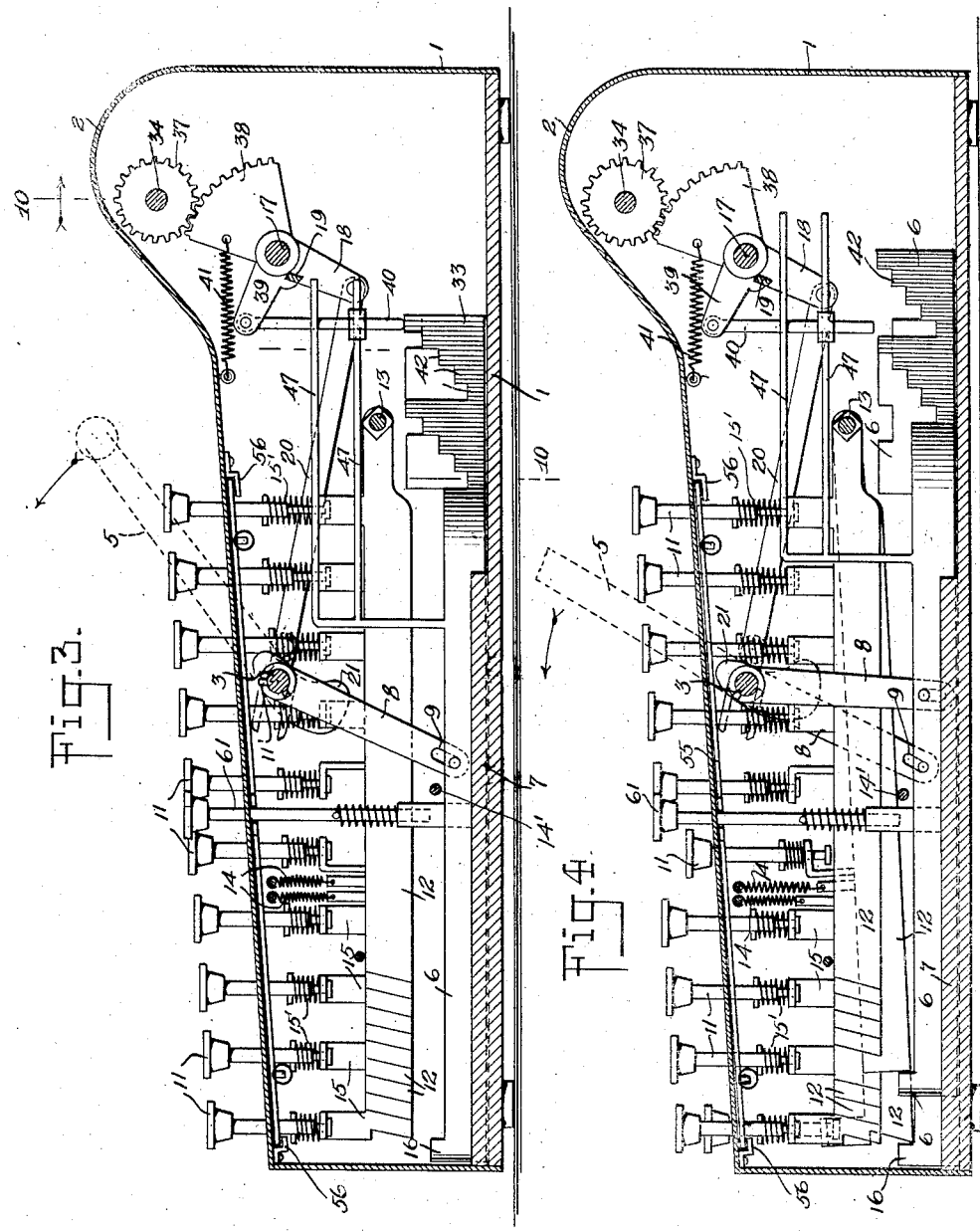

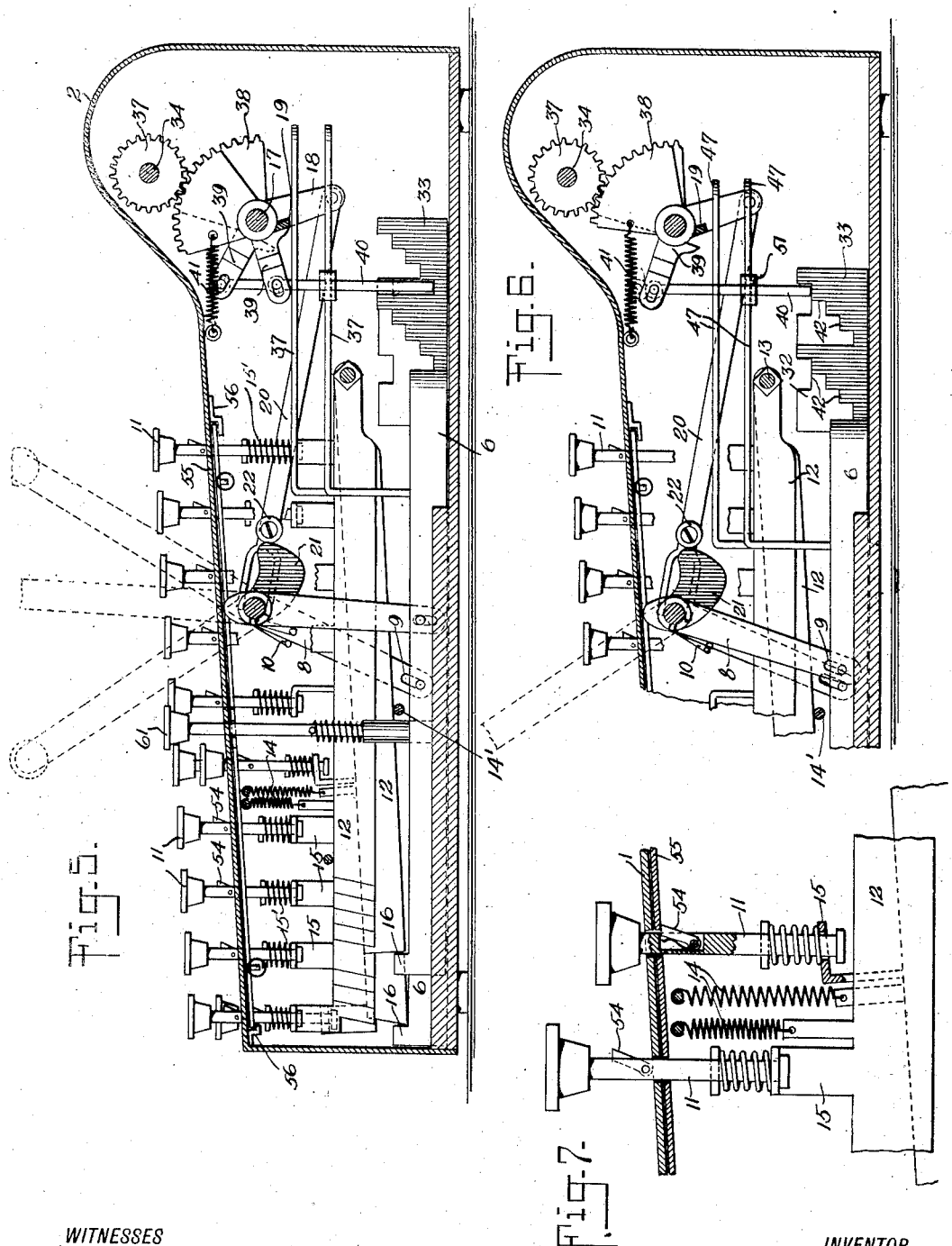

Aug. 7, 1923.

W. H. BERWICK

CALCULATING MACHINE

Filed Aug. 23, 1921

WITNESSES
William P. Goebel
Franklin J. Foster

INVENTOR
W. H. BERWICK
BY
ATTORNEYS

Aug. 7, 1923.
W. H. BERWICK
CALCULATING MACHINE
Filed Aug. 23, 1921
1,464,403
7 Sheets-Sheet 6
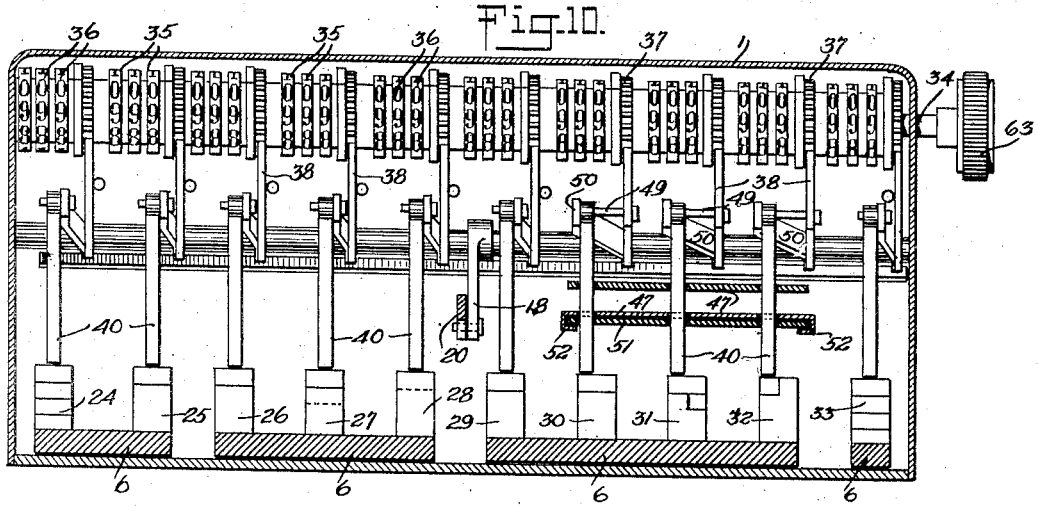
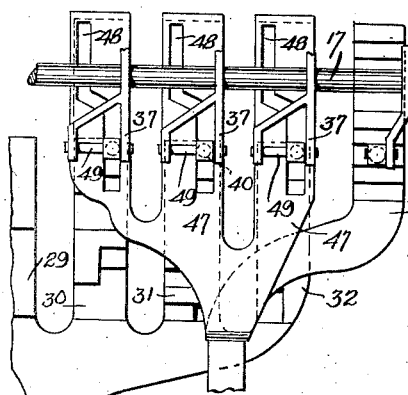
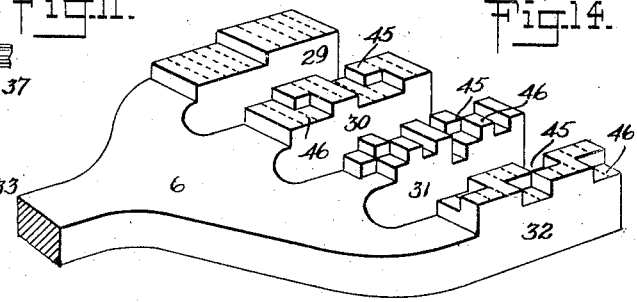
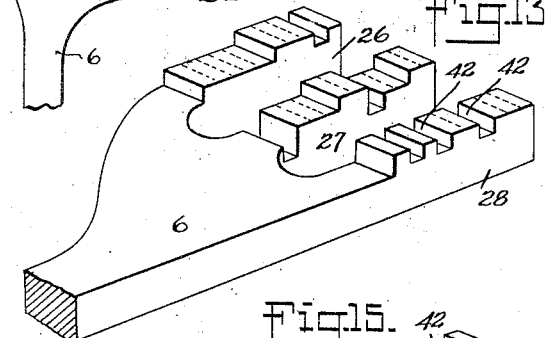
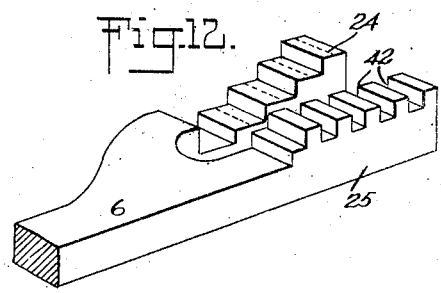
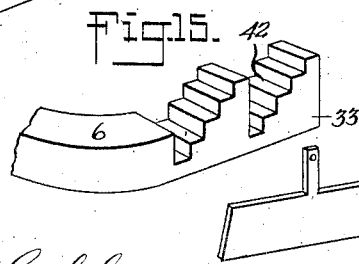
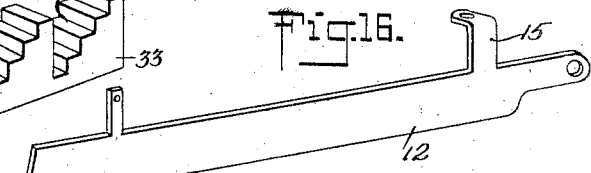
WITNESSES
William P. Goebel
Franklin J. Foster
INVENTOR
W. H. BERWICK
BY
ATTORNEYS

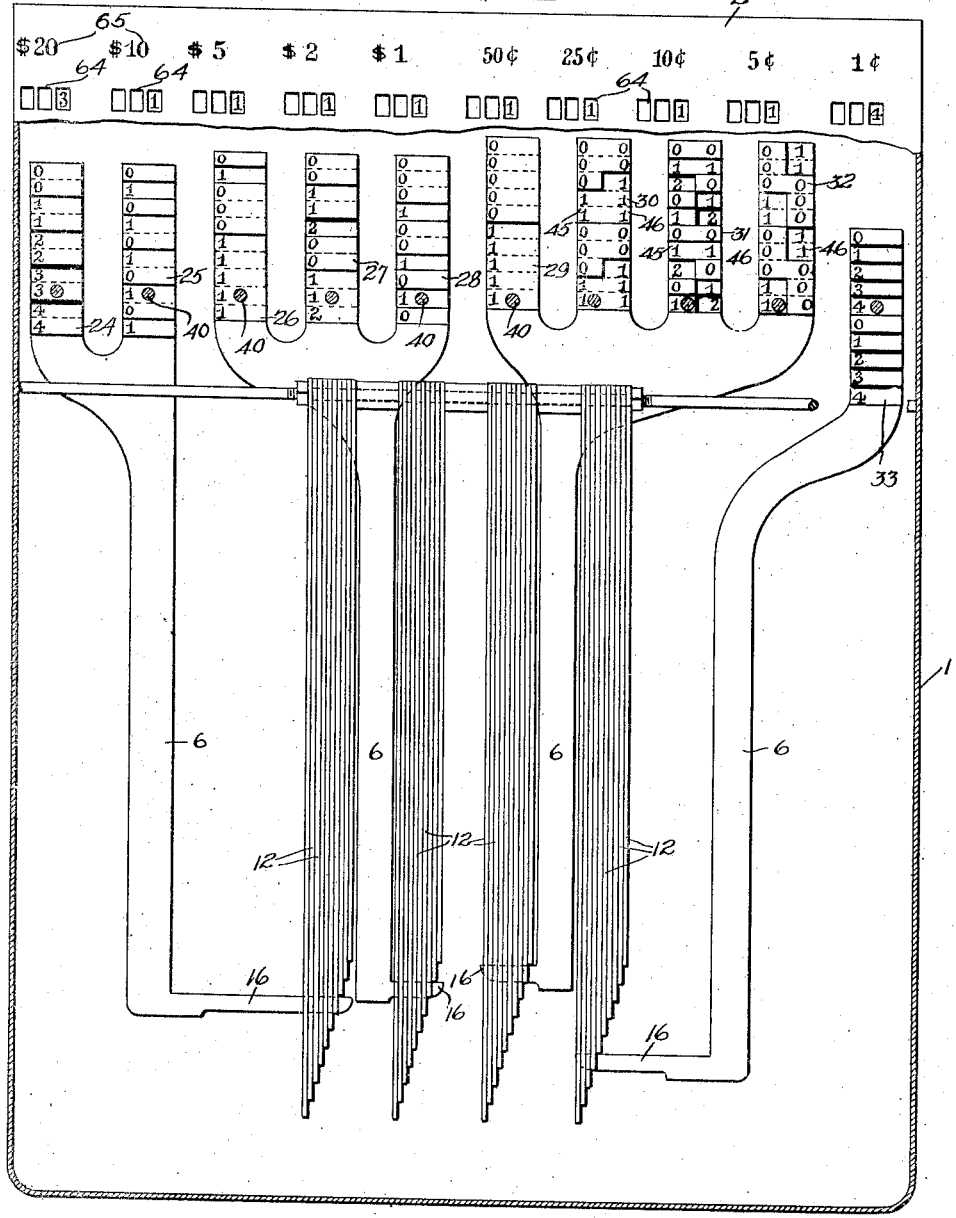

Patented Aug. 7, 1923.

1,464,403

UNITED STATES PATENT OFFICE.

WILLIAM H. BERWICK, OF SYRACUSE, NEW YORK.

CALCULATING MACHINE.

Application filed August 23, 1921. Serial No. 494,461.

*To all whom it may concern:*

Be it known that I, WILLIAM H. BERWICK, a citizen of the United States, and a resident of Syracuse, in the county of Onondaga and State of New York, have invented a new and Improved Calculating Machine, of which the following is a full, clear, and exact descripton.

This invention relates to improvements in calculating machines, particularly to the class of calculators known as denominating machines, an object of the invention being to provide a device of this character which will denominate sums of money into United States currency.

In large industrial plants of various kinds, a great amount of time is wasted in calculating just how many bills and coins of each kind must be drawn from the bank in order to pay off the employees. I have invented a machine which will not only rapidly determine the smallest number of bills and coins necessary to make up any sum of money, but which will also add the number of bills and coins which must be used to make up a plurality of different sums.

To be more specific, one of the objects of the invention is to provide a machine upon which a number of different amounts may be recorded and a result obtained which will give the minimum number of bills and coins necessary to make up all of the amounts.

Another object of the invention is to provide a calculating machine of this character which can be manufactured and sold for a comparatively small price, which will be simple and practical in construction, absolutely accurate in operation and which will occupy very little space.

A further object is to provide a denominating machine, operable independently of any other calculating machine, as distinguished from denominating attachments for calculating machines. It is a still further object to provide a machine of this character, in which each unit of currency is calculated separately and mechanically and the necessity for mental calculation is entirely eliminated.

With these and other objects in view, the invention consists in certain novel features of construction and combinations and arrangements of parts as will be more fully hereinafter described and pointed out in the claims.

In the accompanying drawings:

Figure 3 is a view in longitudinal section on the line 3—3 of Figure 1;

Figure 4 is a view similar to Figure 3 showing one key depressed and the handle in position to pull one of the sector bars forward;

Figure 5 is a similar view showing the ultimate position of the handle and the recording mechanism;

Figure 6 is a similar view showing the ultimate position of the recording mechanism when the selector bar is in another position;

Figure 7 is a fragmentary detail view of two of the keys and key bars and their actuating and holding mechanism;

Figure 10 is a view in section on the staggered line 10—10 of Figure 3;

Figure 11 is a fragmentary top plan detail view of the stop pin shifting mechanism;

Figure 1:
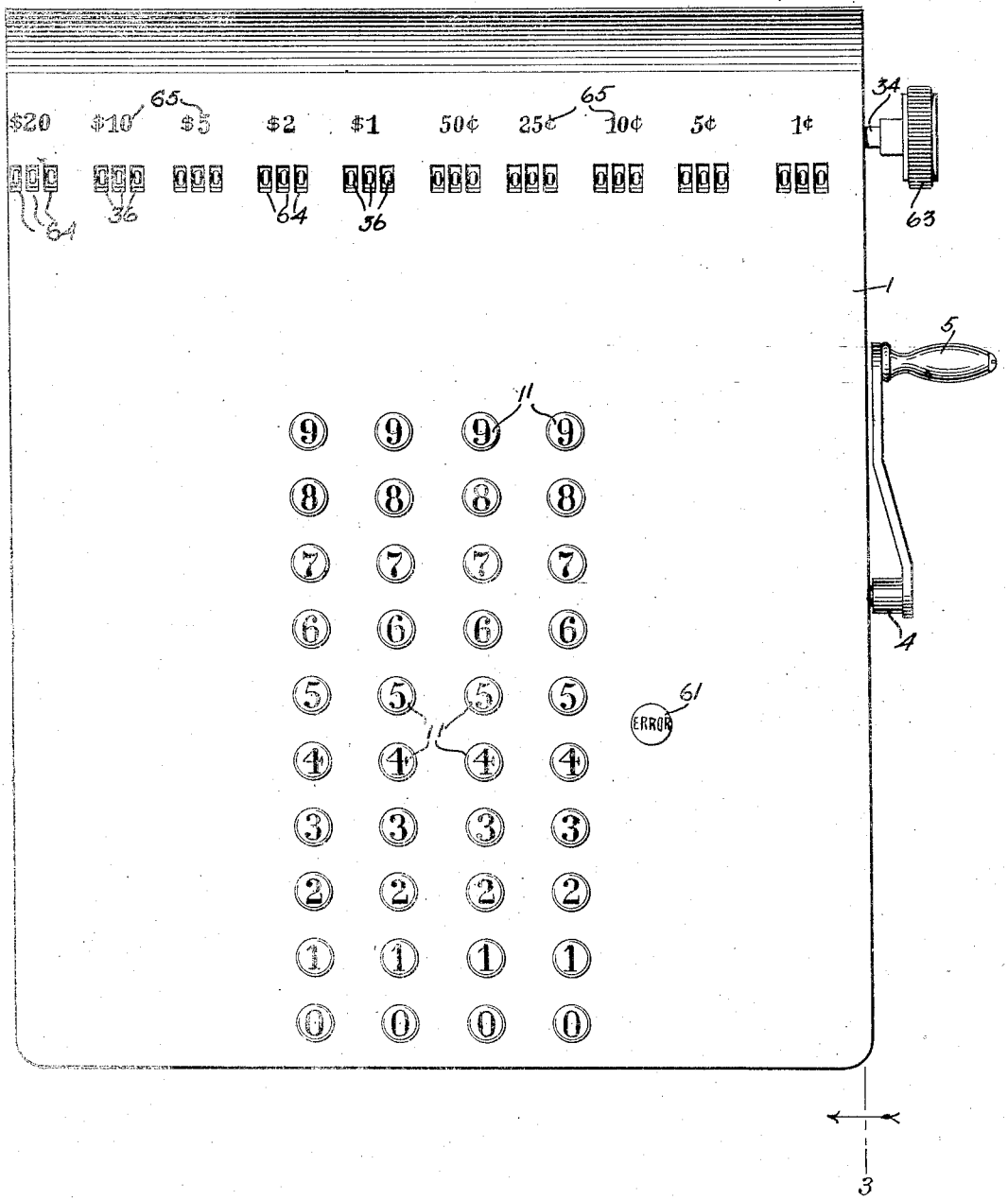
Figure 1 is a top plan view of my improved machine.

Figures 12 to 15 inclusive are enlarged fragmentary perspective views of the notched forward ends of the various selector bars;

Figure 16 is a perspective view of a key bar; and

Figure 17 is a diagrammatic plan view of the machine.

Referring in detail to the drawings, 1 represents a somewhat shallow and substantially rectangular casing which houses my improved machine. The casing cover is bowed upwardly, as indicated by the reference numeral 2, to accommodate the registering mechanism which will be hereinafter described.

Adjacent the casing cover and about the center of the casing, a transverse shaft 3 is mounted in suitable bearings 4 and a crank handle 5 is provided on the outside of the casing to operate the shaft.

A plurality of selector bars such as 6, are slidable in longitudinal grooves in a bed plate 7 on the bottom of the casing. Links 8 loosely mounted on the shaft 3 are operatively connected to the respective selector bars by a slot and pin connection 9.

Torsion springs 10 around the shaft 3 press against the links 8 to pull the selector bars 6 forwardly when the handle 5 is operated. The links at their point of connection with the shaft 3 are cut away to provide shoulders 9' engaged by studs 11' on the shaft 3 to positively return the selector bars to their normal position upon return movement of the shaft 3. The crank handle 5 is operated against the torsion of a coiled spring 10'. This spring acts to return the shaft to its normal position when the crank handle 5 is released.

Longitudinal rows of keys 11 having numerals thereon ranging from zero to nine are mounted in the casing cover. Associated with each row of keys is a group of key bars 12 pivoted at their forward ends on a transverse rod 13. The key bars in each group are arranged side by side and every bar in each group is of a different length. The longest key bars in each group are connected to the zero keys so that depression of the keys depresses the free ends of the key bars against the tension of springs 14 attached to the casing cover, which tend to hold the bars in horizontal position. A stop bar 14' limits the depression of the key bars 12, and a similar bar 15' limits their upward movement.

Apertured angle brackets 15 rigidly supported on the key bars receive the lower ends of the keys and expansion springs 16' around the keys bearing against the brackets compel a depression of the key bars when the keys are depressed and cushion the connection between the keys and bars.

One row of keys and one group of key bars are associated with each of the selector bars 6. The highest numbered key in each row is associated with the shortest key bar in each group, the next highest with the next shortest, etc., and the forward sliding movement of a selector bar is limited by whatever key bar happens to be depressed engaging a lug 16 on the rear end of the selector bar. Checking the movement of a selector bar will not stop the rotation of the shaft 3 which will continue to turn and wind up the springs 10 until the handle has been pulled to its extreme rear position.

A transverse shaft 17 is journaled in the forward end of the casing and a depending link 18 is fixed to the shaft. The link 18 carries adjacent its pivoted end a cross bar 19 located in parallelism with the shaft 17.

The free end of the link 18 is pivotally connected to the forward end of a link 20, the rear end of which, has a slotted pivotal connection with the shaft 3.

Figure 2:
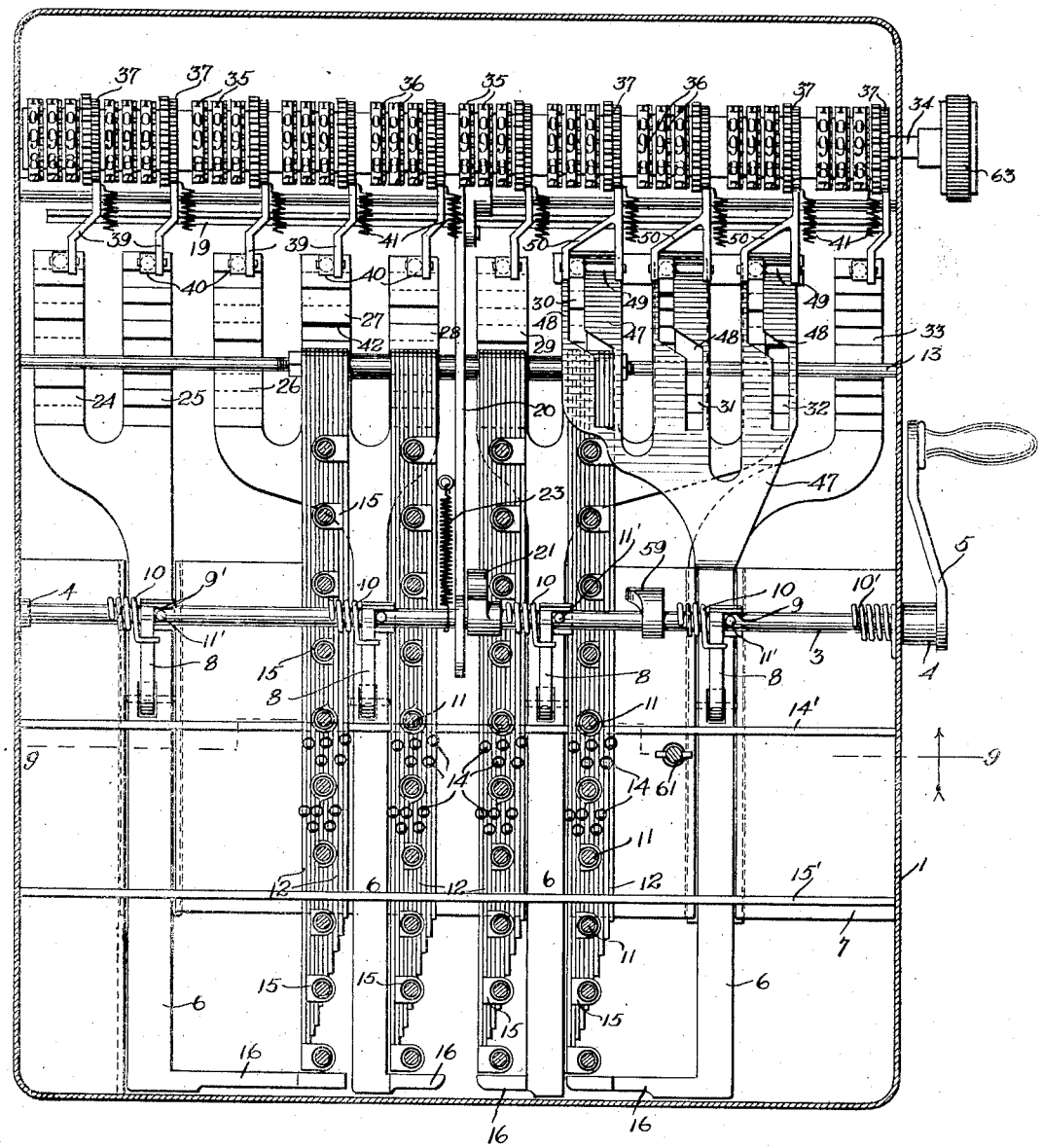
Figure 2 is a plan view with the cover and its associated parts removed.

A cam 21 on the shaft 3 is engageable with a roller 22 on the rear end of the link 20 to move this link forwardly when the shaft 3 is rotated and a coiled spring 23 (Fig. 2) attached to the shaft 3 holds the link 20 in retracted position when the cam 21 is out of the path of the roller 22.

The particular machine illustrated, is only intended for denominating sums of money less than one hundred dollars into twenty dollars bills and lesser bills and currency. For this reason, it is only necessary to provide four selector bars. One of these bars terminates at its forward end in two arms 24 and 25, (Fig. 2) which cooperate with the registering mechanism for twenty dollar and ten dollar bills. The second selector bar terminates in three arms 26, 27 and 28, associated with the five dollar, two dollar and one dollar registering mechanisms. The third bar includes four arms 29, 30, 31 and 32, at its forward end associated with the registering mechanisms, for half dollars, quarters, dimes and nickels, and the forth bar merely has one offset arm 33 cooperating with the penny registering mechanism.

The recording or registering mechanism which is a conventional and well known one, includes a shaft 34 journaled in the enlarged forward portion of the upper end of the casing. A pluraliay of sets of registering wheels 35 having numerals 36 displayed thereon, are mounted on the shaft. One set of recording wheels is associated with each of the arms. A driven pinion 37 is connected to each set of wheels and toothed sectors 38 pivoted on the shaft 17 mesh with the pinions. Rearwardly extending arms 39 carried by the sectors are pivotally connected at their free ends to depending stop pins 40. Springs 41 tend to swing the sectors 38 upwardly and operate the registering wheels 35 through the medium of the pinions 37, but the engagement of the arms 39 with the cross piece 19 prevents swinging of the sectors until the handle 5 is pulled to operate the link 20. The registering wheels are equipped with the usual ratchets (not shown) which cause them to register only when the sectors turn the pinions in one direction so that the upward movement of the sectors has no effect upon the wheels 35.

The arms 24, 25, 26, etc., are of increased height at their forward ends and are formed with a series of notches 42 arranged to limit the movement of the stop pins 40 and control the throw of the sectors 38.

I have illustrated diagrammatically in Figure 17, the arrangement of the notches in the arms of the selector bars. The numerals on the notches indicate the numbers which will be registered by the throw of the sectors 38 when the stop pins 40 are limited by the notches. The numerals 4 are of course on the deepest notches since these notches permit the greatest throw of the sectors and the zero marks indicate the top surface of the arms which prevent any throw of the sectors when engaged by the stop pins.

It is unnecessary to describe in detail the exact arrangement of these notches in all of the arms, since it is apparent that they are arranged to register any given amount to indicate the least number of bills and coins required to make up such an amount. For instance, for fifteen dollars, the machine will register one ten and one five, but for twenty dollars, the five and ten will fail to register due to the arrangement of the notches and the machine will record one twenty instead.

One of the selector bars and its associated arms 24 and 25 cooperate with two sets of registering wheels to register $10 and multiples thereof. The next selector bar and its three arms 26, 27 and 28 are used to control the registering wheels which register dollars and multiples thereof, the third bar and the four arms 29, 30, 31 and 32 coact with the mechanism which registers tenths of dollars in terms of United States currency, and the fourth selector bar controls the registration of hundredths of dollars or pennies. The four rows of keys in like manner represent respective multiples of ten dollars, one dollar, tenths of dollars and hundredths of dollars.

It will be apparent that the notches in the arms 24 and 25 or rather the bases of said notches constitute stops which limit the movement of the register operating mechanism as will be more fully hereinafter described to quickly denominate any figure struck on their associated row of ten dollar keys into terms of twenty dollar and ten dollar bills. Also the next three arms 26, 27 and 28 are so notched as to control the throw of their respective sectors and denominate dollars, struck on the dollar keys into five, two and one dollar bills.

It will also be evident that a single row of notches in each of the arms 30, 31 and 32 controlling the quarter, dime and nickel registers is not sufficient since whenever more than four pennies are struck on the penny keys the tenth of dollars arms 30, 31 and 32 must be used to calculate pennies in terms of nickels as well as calculating tenths of dollars in terms of quarters, dimes and nickels. For instance, in Figure 17, I have shown key bars and selector bars in position to register $78.94. The 94¢ is denominated into a half dollar, quarter, dime, nickel and four pennies. If the next highest key on the penny keys should be depressed registering $78.95 instead of $78.94, it will be evident that instead of registering one dime, one nickel and five pennies, the registering mechanism should register two dimes, no nickels and no pennies. Changing the position of the penny selector bar to make the sum $78.95 instead of $78.94 will not alter the position of the arms 30, 31 and 32, so that they register the correct denomination.

I overcome this difficulty by providing two sets of notches 45 and 46 in each of the arms 30, 31 and 32, and by providing means whereby the position of the penny selector bar determines the particular set of notches in which the stop pins 40 of the quarter, dime and nickel arms operate. In other words, I provide means for shifting these stop pins whenever five cents or more is tabulated on the penny keys.

This stop pin shifting mechanism includes three pairs of arms 47 (Figs. 2 and 11) located above and in alignment with the arms 30, 31 and 32 and having registering slots 48 therein. One end of each of the slots 48 is offset from the other end, so that one end of each slot is over the notches 45 in the arms 30, 31 and 32 and the other end of each slot is over the notches 46 in these arms.

The arms 47 are supported on and carried by the penny selector bar in any approved manner and those stop pins 40 which act with the arms 30, 31 and 32, are mounted for lateral sliding movement on rods 49 carried by brackets 50 integral with the arms 39 from which the pins depend. These stop pins are accommodated in the slots 48 and are coupled for simultaneous lateral movement and held against forward movement by a connecting plate 51 (Fig. 10) slidable in channels 52 on the lower arms 47.

The slots 48 operate to shift the laterally movable stop pins 40 from the notches 45 to the notches 46 whenever five or more pennies are struck on the penny keys.

A novel means is provided for holding the keys 11 in depressed position until the handle 5 has been pulled and for automatically releasing the keys after the machine has registered.

Figure 8:
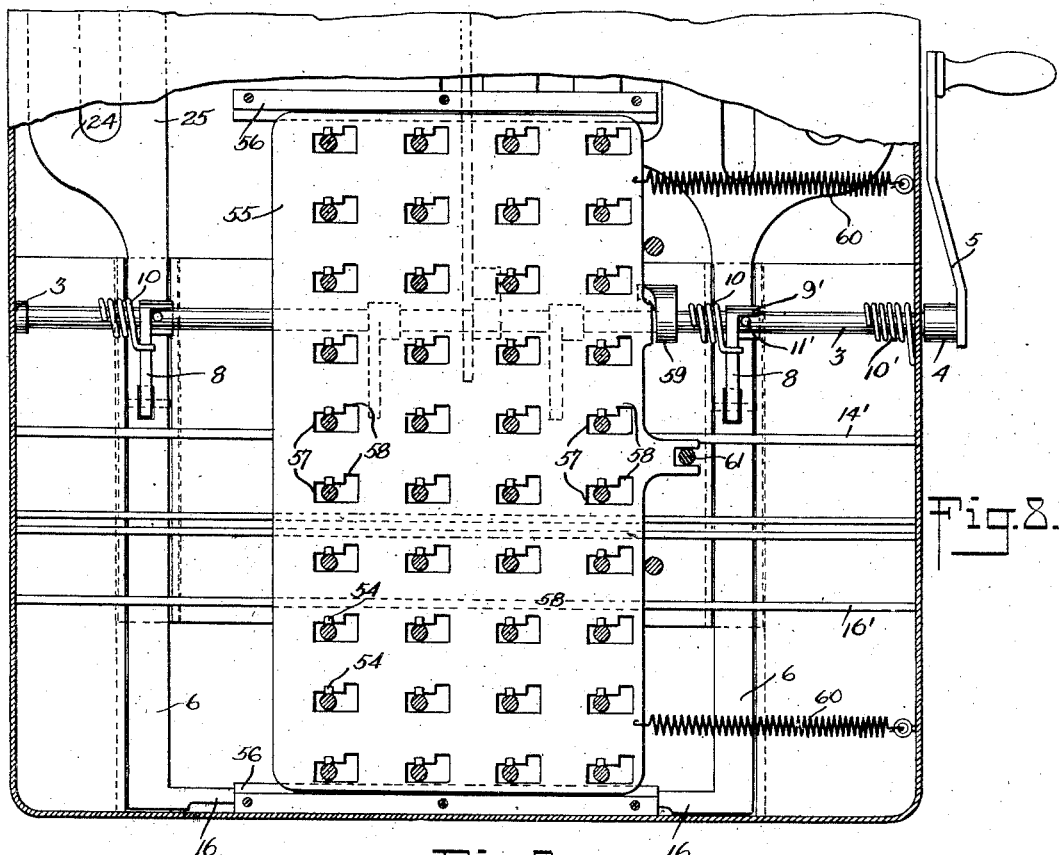
Figure 8 is a fragmentary top plan view of the machine with the cover broken away to expose the details of the sliding plate which holds the keys in depressed position.

Recesses are provided in the casing cover forwardly of each key 11 to provide clearance for the passage of spring held dogs 54 (Figs. 5 and 7) secured in the upper ends of the keys. A plate 55 (Figs. 5 and 8) is slidable laterally in tracks 56 secured to the under side of the casing cover. Slots 57 in the plate 55 accommodate the keys 11. When the keys are depressed, the dogs 54 are forced inwardly by the walls of the slots 57 and engage under the plate. In order to release the keys, it is necessary to slide the plate 55 laterally thereby moving recesses 58 in the plate which communicate with the slots 57 into registration with the recesses in the casing cover, allowing the keys to spring upwardly. This lateral sliding movement of the plate 55 is accomplished through the medium of a cam 59 mounted on the shaft 3 which engages the edge of the plate 55 and pushes it laterally against the tension of springs 60 whenever the shaft 3 is turned.

Figure 9:
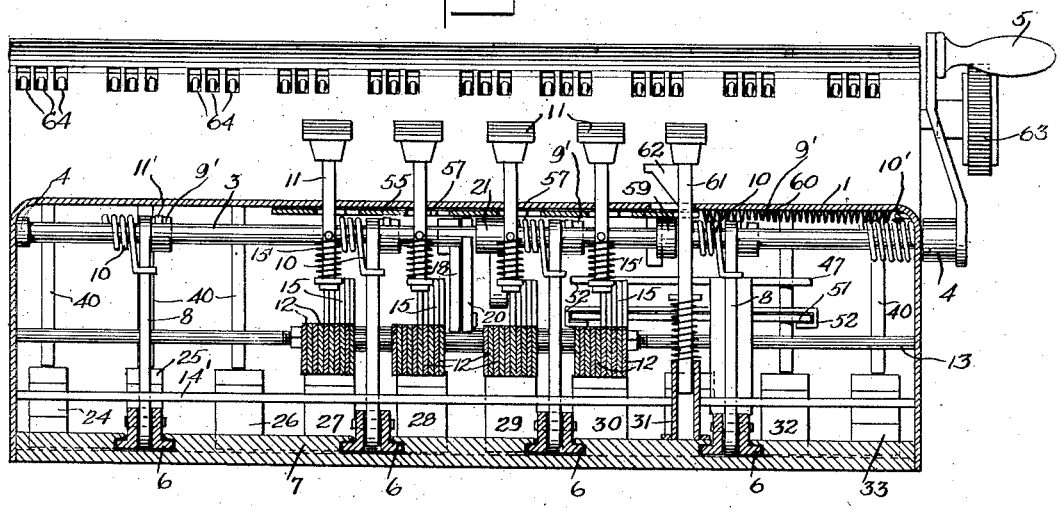
Figure 9 is a view in transverse section on the staggered line 9—9 of Figure 2.

A spring held error key 61 (Figs. 1, 8 and 9) equipped with a cam 62 engageable with the plate 55 may be used to slide the plate laterally and release the keys when a wrong key has accidentally been struck.

The shaft 34 is provided with a handle member 63 for turning the same to clear all of the registers. Openings 64 in the casing cover expose the numerals 36 on the registering wheels 35 and suitable marks 65 are associated with each opening designating the denominations of the numbers displayed therein.

Assuming the registering mechanism to be clear, the operation of the device is as follows:

When any given sum is to be denominated, such for instance, as $78.94, the corresponding keys, 7, 8, 9 and 4 are struck. As these keys are depressed, their key bars 12 are also depressed. The dogs 54 which engage under the sliding plate 55 hold both the keys and key bars in depressed position, the stop bar 14' limiting the downward movement of the key bars. The handle 5 is then pulled rearwardly operating through the medium of the links 8 to pull the selector bars 6 forwardly until the lugs 16 on the ends of these bars are stopped by the depressed key bars. When the selector bars are stopped by the key bars, the proper notches 42 will be in position under the stop pins 40. Further rearward movement of the handle 5 will wind up the springs 10 and will operate the cam 21 to push the link 20 forward swinging the link 18 and moving the cross piece 19 out of the path of the arms 39.

As the cross piece is moved out of the way the springs 41 are free to pull the sectors 38 upwardly turning the pinions 37, but not operating the registering wheels 35 because of the hereinbefore mentioned ratchets associated with the pinions. The upward throw of the sectors is stopped by the engagement of the stop pins 40 with the notches in the arms of the selector bars 6.

Turning of the handle also operates through the medium of the cam 59 to slide the plate 55 and allow the keys and key bars to be restored to their normal position.

When the handle is released, the spring 10' restores it to its normal position, and at the same time the studs 11' engage the shoulders 9' to return the selector bars 6, through the medium of the links 8, to normal position. Returning of the shaft 3 also moves the cam 21 out of the path of the roller 22 allowing the spring to return the link 20 to its retracted position. This movement of the link 20 pulls the link 18 rearwardly, the cross piece 19 engaging the arms 39 forcing the sectors back to their normal position and causing the registering wheels to register as the sectors swing down.

The wheels 35 add as well as register, so that after a number of sums have been checked off, the amount of currency of each denomination necessary to make up all of such sums may be observed through the openings 64.

I have illustrated and described a machine which denominates sums of money less than one hundred dollars into United States currency in terms of twenty dollar bills and less. It will be very apparent that by adding another arm to one of the selector bars with the proper notches therein, the machine might be used to register fifty dollar bills, or by adding other rows of keys and additional selector bars might be utilized to denominate sums of money into still larger bills. I do not wish to limit myself to the details of the notched selector bars since machines operating on the same principle might be manufactured for the purpose of denominating foreign currency.

I have illustrated one of the preferred embodiments of my invention and various slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

I claim:

1. A machine of the character described, comprising a register, a device for operating the register, a plurality of movable selector members, a plurality of other members adapted to engage the selectors and limit the movement of the register operating device, and means operable to shift the position of one of said members relatively to the other.

2. A machine of the character described, comprising a register, a device for operating the register, a plurality of movable sets of selectors, a plurality of members adapted to engage the selectors and limit the movement of the register operating device, and means operable to shift the position of said last mentioned member from one selector set to another.

3. A machine of the character described, comprising a register operating member, a plurality of movable selector members, certain of said selector members having a plurality of stepped faces, pins movable with the register operating member and engaging the stepped faces to limit the movement of the register moving member, and means for moving the pins laterally from one set of stepped faces to another.

4. A machine of the character described, comprising independent registers for quarters, dimes, nickels and pennies, simultaneously movable selectors co-operating with the three first mentioned registers, said selectors having double sets of selecting elements associated therewith, an independently movable selector co-operating with the penny register, and means carried thereby determining the particular sets of selecting elements with which the quarter, dime and nickel registers co-operate, said means including stop pins mounted for lateral sliding movement and carried by the quarter, dime and nickel registers, said stop pins engageable with the selecting elements, and means carried by the penny selector for sliding said stop pins.

5. A machine of the character described, comprising independent registers for quarters, dimes, nickels and pennies, simultaneously movable selectors co-operating with the three first mentioned registers, said selectors having double sets of selecting elements associated therewith, an independently movable selector co-operating with the penny register, and means carried thereby determining the particular sets of selecting elements with which the quarter, dime and nickel registers co-operate, said means including stop pins mounted for lateral sliding movement and carried by the quarter, dime and nickel registers, said stop pins engageable with the selecting elements, and arms carried by the penny selector having staggered slots therein through which said stop pins extend.

6. A machine of the character described, comprising means for denominating a sum into units of currency, including a separate register for each unit, a plurality of simultaneously movable selectors co-operating with certain of said registers, double sets of selecting elements carried by each of the simultaneously movable selectors, movable stop pins carried by said registers selectively engageable with either set of selecting elements, and means for moving said stop pins in accordance with the sum to be denominated.

7. A machine of the character described, comprising means for denominating a sum into units of currency, including a separate register for each unit, a plurality of simultaneously movable selectors co-operating with certain of said registers, double sets of selecting elements carried by each of the simultaneously movable selectors, movable stop pins carried by said registers selectively engageable with either set of selecting elements, means for moving said stop pins in accordance with the sum to be denominated, said stop pin moving means comprising movable arms having staggered slots therein through which said pins project.

8. A machine of the character described, comprising means for denominating a sum into units of currency including a separate register for each unit, a plurality of simultaneously movable selectors co-operating with certain of said registers, double sets of selecting elements carried by each of the simultaneously movable selectors, movable stop pins carried by said registers selectively engageable with either set of selecting elements, means for moving said stop pins in accordance with the sum to be denominated, said stop pin moving means comprising movable arms having staggered slots therein through which said pins project, and an independently movable selector to which said stop pin moving means is rigidly attached.

9. A machine of the character described, comprising a register, actuating means therefor, a stop pin mounted for lateral sliding movement controlling the throw of the actuating means, a plurality of sets of selecting elements with which said pin is selectively engageable, means for moving said pin into co-operative relationship with the proper sets of selecting elements in accordance with the sum denominated.

10. A machine of the character described, comprising a register, actuating means therefor, a stop pin mounted for lateral sliding movement controlling the throw of the actuating means, a plurality of sets of selecting elements with which said pin is selectively engageable, means for moving said pin into co-operative relationship with the proper sets of selecting elements in accordance with the sum denominated, said means including a movable arm having a staggered slot therein through which said pin extends.

11. A machine of the character described, comprising independent registers for quarters, dimes, nickels, and pennies, simultaneously movable selectors co-operating with the three first mentioned registers, said selectors having double sets of selecting elements associated therewith, an independently movable selector co-operating with the penny register, and means carried thereby determining the particular sets of selecting elements with which the quarter, dime and nickel registers co-operate.

12. A machine of the character described, comprising means for denominating a sum into the least number of units of United States currency, including a separate register for each unit, simultaneously movable slectors co-operating with the quarter, dime and nickel registers, each of said registers having a pair of sets of selecting elements adapted to be optionally used, an independently movable selector for the penny register, means carried thereby controlling the sets of selecting elements used in denominating any given sum, stop pins carried by the registering mechanism and engageable with the selecting elements, said last mentioned means comprising slotted arms controlling the position of said stop pins.

13. A machine of the character described, comprising means for denominating a sum into the least number of units of United States currency, including a separate register for each unit, simultaneously movable selectors co-operating with the quarter, dime and nickel registers, each of said registers having a pair of sets of selecting elements adapted to be optionally used, an independently movable selector for the penny register, and means carried thereby controlling the sets of selecting elements used in denominating any given sum.

14. A machine of the character described, comprising means for denominating a sum into the least number of units of currency, said means including a plurality of simultaneously operable selectors, double sets of selecting elements associated with each selector, a register associated with each selector, each of said registers adapted to register a different unit of currency, means engageable with either set of selecting elements, an independently movable selector, and means carried thereby determining the sets of selecting elements with which said limiting means co-operate.

15. A machine of the character described, comprising a set of depressible keys, a plurality of registers, a shaft, means whereby rotation of the shaft when a sum is struck upon the keys denominates said sum into units of currency on the register, said means including actuating means for the registers, slidably mounted selector bars limiting the movement of the actuating means and operated by the shaft, means actuated by depression of the keys for limiting the sliding movement of the selector bars, said last mentioned means comprising pivoted key bars operatively connected to the keys and movable into the path of the selector bars to stop the sliding movement thereof.

16. A machine of the character described, comprising a set of depressible keys, a plurality of registers, a shaft, means whereby rotation of the shaft when a sum is struck upon the keys denominates said sum into units of currency on the register, said means including actuating means for the registers, slidably mounted selector bars limiting the movement of the actuating means and operated by the shaft, and means actuated by depression of the keys for limiting the sliding movement of the slector bars.

17. A machine of the character described, comprising a plurality of rows of keys, sets of key bars associated with and controlled by the keys, a plurality of slidably mounted selector bars, a plurality of independent registers each adapted to register a different unit of currency, said selector bars including integral arms, each of said arms coacting with one of the registers, spring held means for actuating the registers, means carried by the actuating means engageable with the arms of the selector bars to control the operation of the actuating means, and means for successively sliding the selector bars into position and permitting operation of the actuating means.

18. A machine of the character described, comprising a plurality of rows of keys, sets of key bars associated with and controlled by the keys, a plurality of slidably mounted selector bars, a plurality of independent registers each adapted to register a different unit of currency, said selector bars including integral arms, each of said arms coacting with one of the registers, spring held means for actuating the registers, and means carried by the actuating means engageable with the arms of the selector bars to control the operation of the actuating means.

19. A machine of the character described, comprising a registering mechanism, a set of keys, depressible key bars controlled by the keys, a plurality of slidably mounted selector bars limited in their sliding movement by the keys, spring held means engageable with the registering mechanism to actuate the same, means normally holding said last mentioned means in inoperative position against the tension of the springs, means for successively sliding the selector bars and moving said holding means to inoperative position, and means engageable with the selector bars for limiting the throw of the actuating means for the registering mechanism, said selector bars having notches therein, said last mentioned means comprising stop pins engaging in the bottom of the notches.

20. A machine of the character described, comprising a registering mechanism, a set of keys, depressible key bars controlled by the keys, a plurality of slidably mounted selector bars limited in their sliding movement by the keys, spring held means engageable with the registering mechanism to actuate the same, means normally holding said last mentioned means in inoperative position against the tension of the springs, means for successively sliding the selector bars and moving said holding means to inoperative position, and means engageable with the selector bars for limiting the throw of the actuating means for the registering mechanism.

WILLIAM H. BERWICK.